(12) United States Patent
Vorsanger

(10) Patent No.: US 9,842,229 B2
(45) Date of Patent: Dec. 12, 2017

(54) AUTOMATED APPLICATION ANALYSIS FOR FINDING LEAKED PERSONAL INFORMATION

(71) Applicant: RAYTHEON BBN TECHNOLOGIES CORP., Cambridge, MA (US)

(72) Inventor: Gregory Alexander Vorsanger, Baltimore, MD (US)

(73) Assignee: RAYTHEON BBN TECHNOLOGIES CORP., Cambridge, MA (US)

(*) Notice: Subject to any disclaimer, the term of this patent is extended or adjusted under 35 U.S.C. 154(b) by 138 days.

(21) Appl. No.: 15/005,845

(22) Filed: Jan. 25, 2016

(65) Prior Publication Data

US 2017/0024583 A1    Jan. 26, 2017

Related U.S. Application Data

(60) Provisional application No. 62/195,690, filed on Jul. 22, 2015.

(51) Int. Cl.
*G06F 21/62* (2013.01)
*G06F 21/55* (2013.01)
*G06F 21/56* (2013.01)

(52) U.S. Cl.
CPC ........ *G06F 21/6263* (2013.01); *G06F 21/556* (2013.01); *G06F 21/567* (2013.01)

(58) Field of Classification Search
CPC ... G06F 21/556; G06F 21/567; G06F 21/6263
See application file for complete search history.

(56) References Cited

U.S. PATENT DOCUMENTS

| | | | |
|---|---|---|---|
| 9,246,980 B2* | 1/2016 | Twitchell | H04L 45/586 |
| 9,584,393 B2* | 2/2017 | Kjendal | H04L 43/12 |
| 2006/0037077 A1* | 2/2006 | Gadde | H04L 63/168 726/23 |
| 2011/0099273 A1* | 4/2011 | Ide | G06F 11/3006 709/224 |
| 2013/0298201 A1* | 11/2013 | Aravindakshan | H04L 63/0272 726/4 |

* cited by examiner

*Primary Examiner* — Beemnet Dada
(74) *Attorney, Agent, or Firm* — Lewis Roca Rothgerber Christie LLP

(57) ABSTRACT

A method for detecting instances of exfiltration by an application. The method includes performing a first set of runs on a first computation device, and performing a second set of runs on a second computation device. Each set of runs involves running the application a plurality of times; and for each run, capturing packets transmitted by the computation device. In some embodiments the packets within the first set of runs are compared to identify differences caused by environmental noise, such as run-to-run changes in the information sent to the first device by remote servers. Comparisons between (i) runs performed on the first device and (ii) runs performed on the second device, with differences caused by environmental noise removed, may then be used to assess whether the application exfiltrates personal information, such as a phone number, that has different values on the first device and on the second device.

13 Claims, 4 Drawing Sheets

AUTOMATED APPLICATION ANALYSIS FOR FINDING LEAKED PERSONAL INFORMATION

CROSS-REFERENCE TO RELATED APPLICATION(S)

The present application claims priority to and the benefit of U.S. Provisional Application No. 62/195,690, filed 22 Jul. 2015, entitled "AUTOMATED APP ANALYSIS FOR FINDING LEAKED PERSONAL INFORMATION USING TWIN PHONES", the entire content of which is incorporated herein by reference.

BACKGROUND

1. Field

One or more aspects of embodiments according to the present invention relate to data security, and more particularly to a method for determining whether an application is configured to exfiltrate personal information from a device on which it runs.

2. Description of Related Art

Various computation devices in current use may each run a variety of applications, or "apps", each of which may exchange data with other devices such as servers, over one or more networks such as the Internet. The data exchanged by such applications with other devices may include personal information, e.g., information that may be confidential to some degree. Personal information may include, for example, a telephone number associated with a device (e.g., with a mobile phone) or the email address of a user. Some such information may be moderately confidential and some may be highly confidential, according, for example, to the degree of harm that may result if the information is misused. All such information is referred to herein as "personal" information.

An exchange of personal information may occur with a user's knowledge and consent, for example if a user is using an application to send her phone number to another user. In other cases it may occur without the user's knowledge and/or against the user's wishes, as, for example, if it results in undesired and burdensome unsolicited phone calls after an application sends a user's phone number to a telemarketing company. Such sending of personal data, without a user's express instructions or consent to do so, is referred herein as exfiltration.

As such, there are commercial uses for, and there is a need for, a method for identifying applications that exfiltrate personal data, so that users may avoid their use or uninstall them.

SUMMARY

Aspects of embodiments of the present disclosure are directed toward a system and method for characterizing an application to assess whether the application exfiltrates personal information. In one embodiment, the application is run several times on a first device and then run several times on a second device. Outgoing data packets are saved from each run. Comparisons between the runs performed on the first device are used to identify run-to-run differences caused by environmental noise, such as run-to-run changes in the information sent to the first device by remote servers. Comparisons between runs performed on the first device and runs performed on the second device, with differences caused by environmental noise removed, are then used to assess whether the application exfiltrates personal information, such as a phone number, that has different values on the first device and on the second device.

According to an embodiment of the present invention there is provided a method for detecting instances of exfiltration by an application, the method including: performing a first set of runs, the performing of the first set of runs including: running the application a plurality of times on a first computation device; and for each run, capturing packets transmitted by the first computation device to form a first plurality of captured packets; performing a second set of runs, the performing of the second set of runs including: running the application a plurality of times on a second computation device; and for each run, capturing packets transmitted by the second computation device to form a second plurality of captured packets; comparing packets from among the first plurality of captured packets pairwise to form a first list of packet location identifiers, each packet location identifier corresponding to a difference found between a packet from one run of the first set of runs and a corresponding packet from another run of the first set of runs; comparing packets from among the first plurality of captured packets pairwise with packets from among the second plurality of captured packets, to form a first set of inter-device differences; and eliminating from the first set of inter-device differences each difference corresponding to a packet location identifier in the first list of packet location identifiers.

In one embodiment, the method includes: uninstalling the application from the first computation device when the first set of inter-device differences, after eliminating, from the first set of inter-device differences, each difference corresponding to a packet location identifier in the first list of packet location identifiers, is not empty.

In one embodiment, the method includes comparing packets from among the second plurality of captured packets pairwise to form a second list of packet location identifiers, each packet location identifier corresponding to a difference found between a packet from one run of the second set of runs and a corresponding packet from another run of the second set of runs.

In one embodiment, the method includes merging the second list of packet location identifiers into the first list of packet location identifiers.

In one embodiment, the second set of runs includes the same number of runs as the first set of runs.

In one embodiment, the method includes: before performing the first set of runs, putting the first computation device into a first state; and after performing the first set of runs: putting the first computation device into a second state; and performing a third set of runs, the performing of the third set of runs including: running the application a plurality of times; and for each run, capturing packets transmitted by the first computation device to form a third plurality of captured packets; comparing packets from among the first plurality of captured packets pairwise with packets from among the third plurality of captured packets, to form a second set of inter-device differences; and eliminating, from the second the set of inter-device differences, each difference corresponding to a packet location identifier in the first list of packet location identifiers.

In one embodiment, the method includes: uninstalling the application from the first computation device when the second set of inter-device differences, after eliminating, from the second set of inter-device differences, each difference corresponding to a packet location identifier in the first list of packet location identifiers, is not empty.

In one embodiment, in the first state, an email client running on the first computation device is logged in to a first email account and in the second state, the email client is logged in to a second email account, different from the first email account.

According to an embodiment of the present invention there is provided a method for detecting instances of exfiltration by an application, the method including: putting a first computation device into a first state; performing a first set of runs with the first computation device in the first state, the performing of the first set of runs including: running the application a plurality of times on the first computation device; and for each run, capturing packets transmitted by the first computation device to form a first plurality of captured packets; putting the first computation device into a second state; performing a second set of runs with the first computation device in the second state, the performing of the second set of runs including: running the application a plurality of times on the first computation device; and for each run, capturing packets transmitted by the first computation device to form a second plurality of captured packets; comparing packets from among the first plurality of captured packets pairwise to form a first list of packet location identifiers, each packet location identifier corresponding to a difference found between a packet from one run of the first set of runs and a corresponding packet from another run of the first set of runs; comparing packets from among the first plurality of captured packets pairwise with packets from among the second plurality of captured packets, to form a first set of inter-device differences; and eliminating, from the first set of inter-device differences, each difference corresponding to a packet location identifier in the first list of packet location identifiers.

In one embodiment, the method includes: uninstalling the application from the first computation device when the first set of inter-device differences, after eliminating, from the first set of inter-device differences, each difference corresponding to a packet location identifier in the first list of packet location identifiers, is not empty.

In one embodiment, the method includes comparing packets from among the second plurality of captured packets pairwise to form a second list of packet location identifiers, each packet location identifier corresponding to a difference found between a packet from one run of the second set of runs and a corresponding packet from another run of the second set of runs.

In one embodiment, the method includes merging the second list of packet location identifiers into the first list of packet location identifiers.

In one embodiment, the second set of runs includes the same number of runs as the first set of runs.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method for automated application analysis for finding leaked personal information provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
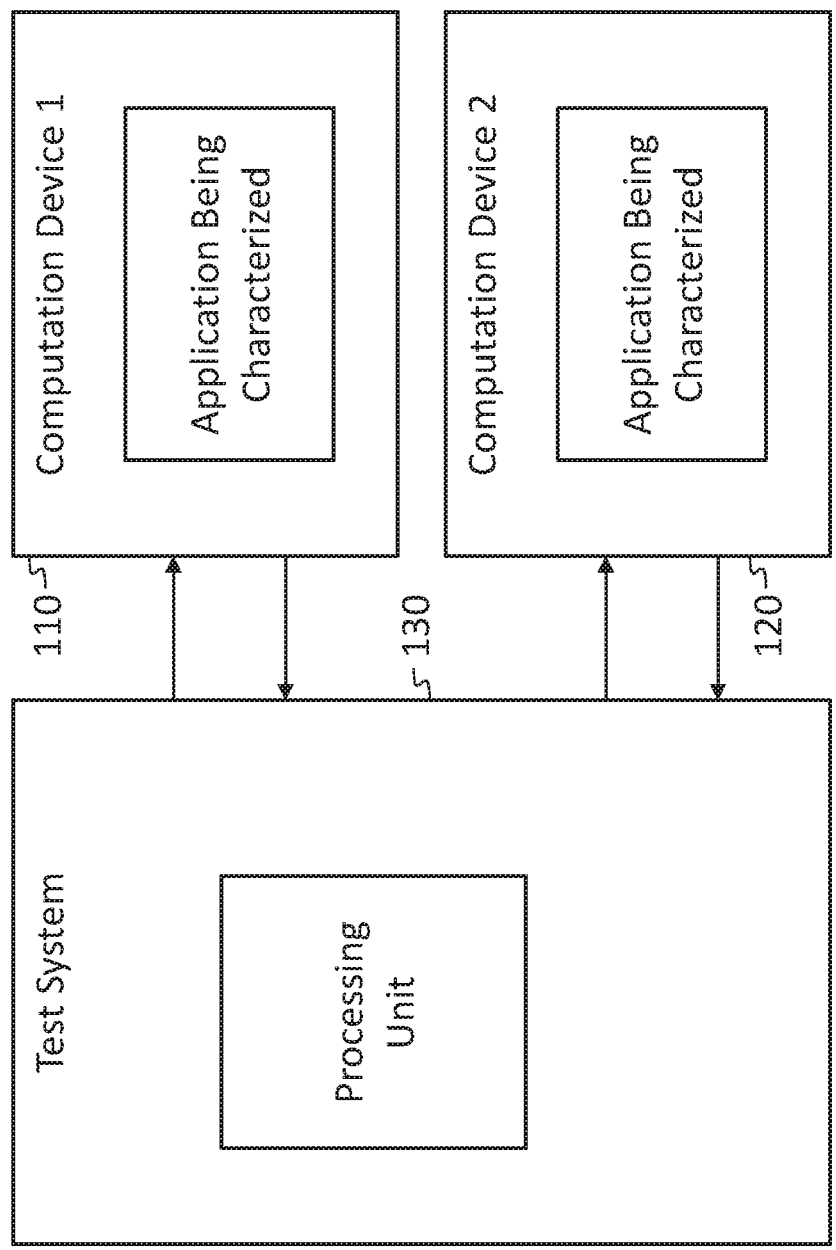
FIG. 1 is a block diagram of a system for characterizing an application, according to an embodiment of the present invention.

Referring to FIG. 1, in one embodiment, a first computation device 110 and a second computation device 120 are connected to a test system to test an application (the "application being characterized") to determine whether the application exfiltrates personal information. Each of the first computation device 110 and the second first computation device 120 may for example be a mobile phone, capable of receiving user input and displaying output to a user, and also capable of sending and receiving data over a network, e.g., over the Internet. During operation, a test system 130 may provide inputs to, and receive outputs from, the first computation device 110 and the second computation device 120. In addition, during testing, a user may interact directly with the first computation device 110 and the second computation device 120. Interactions by the first computation device 110 and the second computation device 120 through a network (e.g., through the Internet) may pass through the test system 130, which may monitor, record, or modify data sent or received by the first computation device 110 and the second computation device 120 during testing.

The test system may contain a processing unit and various interface components for connecting to the first computation device and the second computation device. In one embodiment, the test system interacts with emulation software running on the first computation device 110 and the second computation device 120 that emulates the effects of user input, e.g., by running instead of a sensor driver (that otherwise would relay sensor data to applications) and sending simulated user input date to the application, or by working with such a driver, e.g., intercepting the output of the driver and substituting simulated user inputs sent to the emulation software by the test system.

Figure 2:
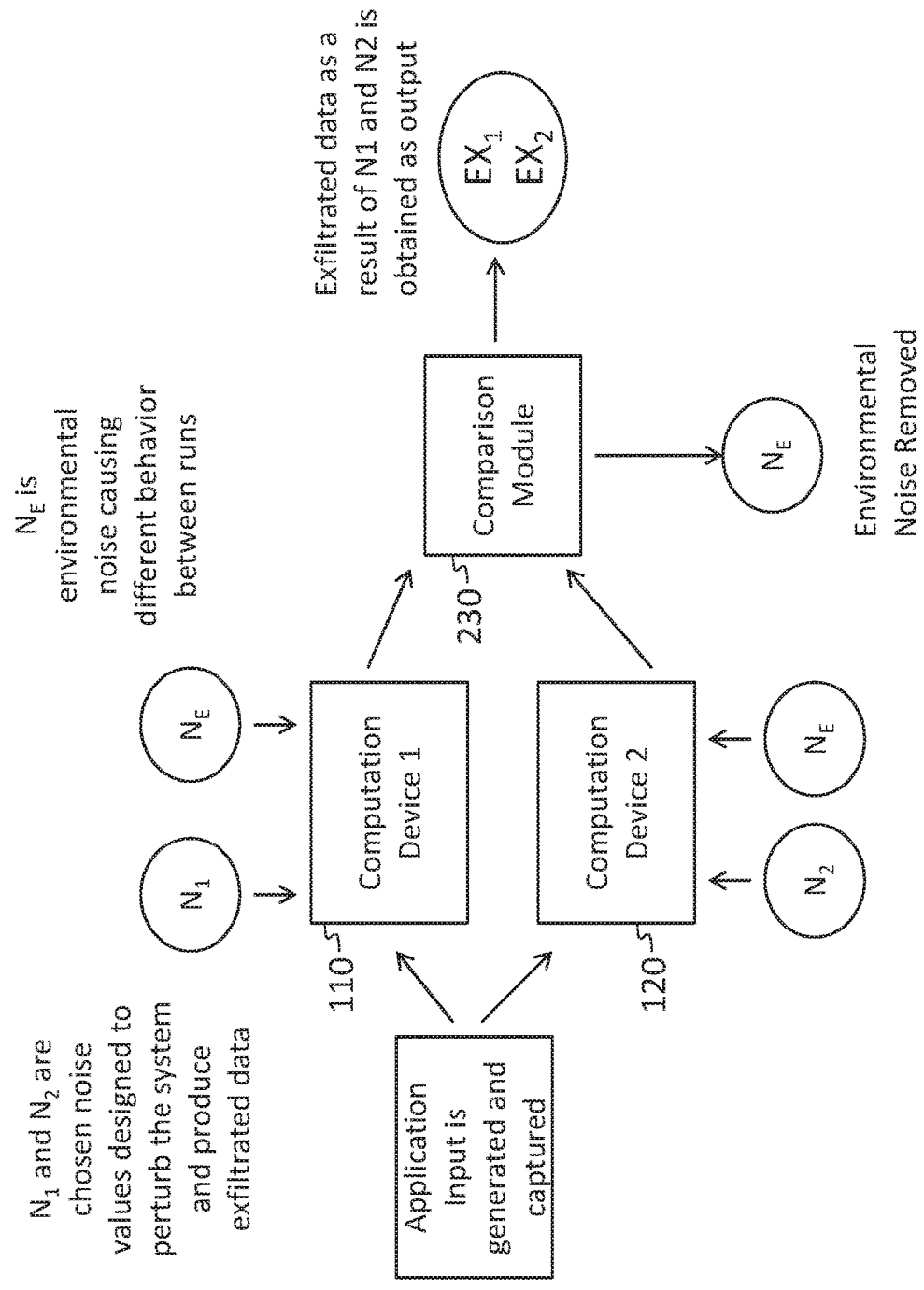
FIG. 2 is a hybrid dataflow and block diagram of a system for characterizing an application, according to an embodiment of the present invention.

Referring to FIG. 2, in one embodiment, the first computation device 110 and the second computation device 120 are used to test an application to determine whether the application exfiltrates personal information. Initially, the application is operated, e.g., by a human user, and the user input is captured and saved, e.g., in a file containing what is referred to herein as a user input sequence. The user input sequence may then be replayed repeatedly to the application, to simulate a user interacting with the application, for the purpose of characterizing the application's behavior. The user input may be considered to be "noise" in the sense that during ordinary operation of the application, it may not be regular or repeatable. This noise, or "user input noise" is represented by the symbol $N_1$ in FIG. 2.

During operation, noise other than that captured in a user input sequence, which may be referred to as "environmental" noise, and which is represented by the symbol $N_E$ in FIG. 2, may also influence the behavior of the application. For example sensor data (e.g., data from an accelerometer, temperature sensor, or Global Positioning System (GPS) sensor in a mobile phone) may be read by the application, and may influence the application's behavior. Environmental noise may also include noise such as network traffic. For example, the application may be configured to display advertising to the user. To do so, the application may send a request to a server for an advertisement, and the server may select an advertisement based on various factors that may vary randomly with time, such as the price bids of various advertisers, or a pseudorandom variable used to ensure that users see a variety of advertising. Other applications running on the same device, and, e.g., competing with the application being characterized for resources such as processor time or memory, may also act as sources of environmental noise.

Environmental noise may vary with time and may be difficult to control, so that if the application is run multiple times using the same simulated user input (i.e., the user input sequence), the behavior of the application, and the output it generates, may nonetheless vary, e.g., as a result of environmental noise.

In one embodiment, the application may be run a number of times, e.g., k times (where k is a positive integer) on the first computation device 110, and the data packets the first computation device 110 sends out (e.g., through a network interface card (NIC) on the device) may be recorded. For each run, the group of outgoing data packets recorded may be referred to as an outgoing packet capture or outgoing PCAP. Incoming data packets received during each run by the first computation device 110 may also be recorded and the group of such packets for any run may be referred to as an incoming packet capture or incoming PCAP.

The same application may also be run multiple times (e.g., m times) on the second computation device 120 using the same simulated user input (i.e., the user input sequence), and, for each run, the group of outgoing data packets (i.e., an outgoing PCAP) and the group of incoming data packets (i.e., an incoming PCAP) may be recorded.

All of the recorded data packets, i.e., (i) the recorded outgoing PCAP and the recorded incoming PCAP for each run of the k runs on the first computation device 110, and (ii) the recorded outgoing PCAP and the recorded incoming PCAP for each run of the m runs on the second computation device 120, may then be fed into a comparison module 230. In one embodiment, the comparison module 230 identifies differences between outgoing PCAPs that occur on one device as being due to environmental noise, because the user input noise and personal information are the same for each such run.

The comparison module 230 then checks for exfiltration of personal information as follows. Any difference between an outgoing PCAP for a run on the first computation device 110 and an outgoing PCAP for a run on the second computation device 120, is identified, if the difference is not already identified as being due to environmental noise, as an instance of exfiltration of personal information (such as phone numbers) associated with the first computation device 110 and the second computation device 120 and that is different in the two respective computation devices. The existence of any such data (if any is identified) may then be used to make determinations about whether or when to run the application, or whether to uninstall or otherwise disable the application, to control the release of personal information.

Figure 3:
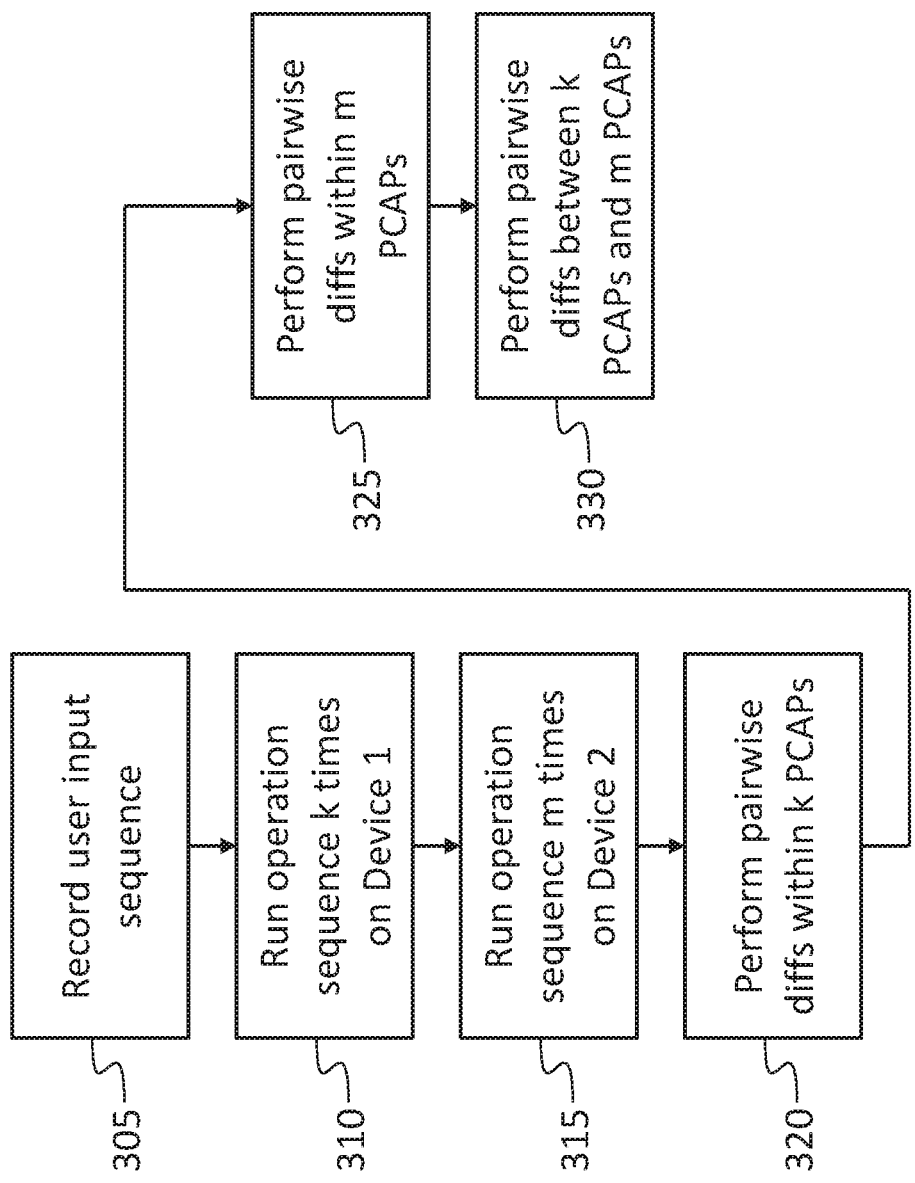
FIG. 3 is a flow chart of a method for characterizing an application, according to an embodiment of the present invention.

FIG. 3 shows this process in greater detail. In a first act 305, a user input sequence is created, for example by recording user input while a user uses the application, or using a development tool such as the Application Exerciser Monkey (available at developer.android.com). In a second act 310, the application being characterized is run multiple times, e.g., k times, on the first computation device 110, each time with simulated user input resulting from playing back the user input sequence. During each run, the incoming PCAP is recorded and saved and the outgoing PCAP is recorded and saved. In a third act 315, the application being characterized is run multiple times, e.g., m times, on the second computation device 120, each time with simulated user input resulting from playing back the user input sequence. During each run of this second set of m runs, the incoming PCAP is recorded and saved and the outgoing PCAP is recorded and saved. In some embodiments m=k, i.e., the number of runs in the first set of k runs is the same as the number of runs in the second set of m runs.

In an act 320, pairwise differences are then performed, in the comparison module 230, on the set of outgoing PCAPs from the first set of k runs, performed with the first computation device 110. These differences are used to identify differences caused by environmental noise.

In one embodiment, a diff command is used to perform these differences. As one of skill in the art will understand, the diff command is a data comparison tool that may be used to calculate the differences between two sets of characters, e.g., between two text files. A diff command is a part of the UNIX™ and LINUX™ operating systems, for example. The diff command is line-oriented and it is designed to determine and output (e.g., display) the smallest set of line deletions and line insertions to create one character set (e.g., file) from the other. Given one character set and the changes, the other character set can be created, by applying the set of insertions and deletions generated by the diff command.

To form suitable input for the diff command, a first outgoing PCAP (from a first run of the k runs) and a second outgoing PCAP (from a second run of the k runs) may each be formatted as a set of lines by the insertion of new line and/or line feed characters, e.g., the insertion of one line feed character at the end of each packet. If the outgoing PCAPs are formatted in this manner, then the output of the diff command may contain, for each packet in the first outgoing PCAP that is not identical to a corresponding packet in the second outgoing PCAP, an output line indicating a deletion (e.g., of the packet from the first outgoing PCAP), and a second output line showing an insertion (e.g., of the packet from the second outgoing PCAP). The output of the diff command may also contain line numbers corresponding to each of the two inputs, so that the locations of the packets affected by environmental noise within each outgoing PCAP may be determined.

The diff command may be run pairwise for each pair of outgoing PCAPs in the outgoing PCAPs from the first set of runs (i.e., the set of k runs). As a result, there may be k choose 2 such diff commands run, with a corresponding output for each run of the diff command. As used herein, "k choose 2" is given by $k!/((k-2)!2!)$ (where the exclamation mark indicates a factorial operation). This expression may also be written as $(k)(k-1)/2$. The diff command outputs may then be analyzed to characterize the effects of environmental noise and identify packets affected by, and/or packet differences caused by, environmental noise.

For example, if the application being characterized requests an advertisement from an advertisement server and the advertisement server randomly serves one of two different advertisements, and each advertisement further results in additional data being sent out by the application (e.g., the application may send out requests for images to be displayed within the respective advertisement), then the contents of the corresponding outgoing PCAPs will differ, and the output of the diff command may accordingly show a deletion and an insertion in a particular packet (e.g., in a simple case, the $j^{th}$ packet). The comparison module may then identify the $j^{th}$ packet as one that varies because of environmental noise.

In some situations the number of outgoing packets produced by the application may vary as a result of environmental noise, in which case, if there is further variation as described above resulting from two different advertisements being served, this further variation may not consistently occur in the same absolute location (e.g., as identified by a packet number) in the outgoing PCAP. However, because the diff operator is designed to represent differences with the fewest corresponding insertions and deletions, the diff operator may nonetheless succeed in lining up the packets corresponding, in each respective outgoing PCAP, to the difference caused by different advertisements having been served. The comparison module may then identify the location of this particular difference in some other manner (instead of by packet number), e.g., by the content of the preceding packet, if it is the same in both outgoing PCAPs, or by the content of the last common packet prior to the packets containing the difference, and the location of the difference relative to this last common packet. A quantity identifying the location of a difference between PCAPs (such as the absolute location of the packet containing the difference, the content of the preceding packet, or the content of the last common packet and an offset from the location of the last common packet) is referred to herein as a "difference location identifier" for the difference.

In this manner, a first list of difference location identifiers for differences identified as being caused by environmental noise may be produced by the pairwise differences performed in the act 320, in the comparison module 230, on the set of outgoing PCAPs from the first set of k runs, performed with the first computation device 110. As mentioned above, the location identifiers may take various forms, being for example absolute packet locations, or packet locations relative to a packet with particular content.

In an act 325, pairwise differences may also be performed, in the comparison module 230, on the set of outgoing PCAPs from the second set of m runs, performed with the second computation device 120. These differences may also be used to identify differences that may be caused by environmental noise, using, for example, the same method as the one described above for use with the set of outgoing PCAPs from the first set of k runs, performed with the first computation device 110. The results of the pairwise differences performed in the act 325 may be a second, additional list of difference location identifiers for differences identified as being caused by environmental noise. In one embodiment the lists are merged (e.g., the second list is merged into the first list) to form a single list of difference location identifiers, e.g., by adding to the first list each difference location identifier from the second list that is not already on the first list.

In an act 330, pairwise comparisons may be performed between the set of outgoing PCAPs from the first set of k runs, performed with the first computation device 110 and the set of outgoing PCAPs from the second set of m runs, performed with the second computation device 120. The diff operator may again be used. In one embodiment, any difference discovered is checked against a list of difference location identifiers for differences identified as being caused by environmental noise, and if the difference discovered is at a location not matching any of the locations in the list, then it is identified as a difference potentially caused by exfiltration of personal information (such as a phone number) that is different in the two computation devices. In one embodiment the list of difference location identifiers for differences identified as being caused by environmental noise is the first list of difference location identifiers for differences identified as being caused by environmental noise; in another embodiment it is the result of merging the first list with the second list.

The methods described herein may be used to detect exfiltrated personal information even if the personal information is encoded, encrypted, or otherwise modified before being sent out from the device. For example, an application may encrypt a phone number before sending it to a server, where it may subsequently be decrypted. In such a case, an alternate approach that merely inspects outgoing packets for the presence of the (unencrypted) phone number of the computation device may fail to detect the exfiltration, whereas methods according to embodiments of the present invention may succeed.

In another example, the personal information may identify the device, but the identifier may be one assigned by a server, rather than an inherent characteristic of the device such as a phone number or media access control (MAC) address. When an application first runs on a computation device it may, for example, send an identification assignment request to a server, which may respond by sending, in return, a unique identification number (or string), that the application may then store on the computation device. Subsequent communications sent to the server by the application may then include the unique identification number (i.e., in such communications the application may exfiltrate the unique identification number), allowing the server to identify the activities of the computation device. The exfiltration of such a unique identification number may be undesirable to a user who may prefer that even information allowing various on-line activities of the user to be grouped not be made available to others, e.g., to advertisers.

The exfiltration of server-assigned unique identification numbers may, like encrypted personal information, be difficult to detect using alternate methods such as inspecting outgoing packets for the presence of a computation device's telephone number.

In some embodiments diffs of incoming PCAPs may also be performed. Differences detected in the incoming PCAPs may then be correlated with differences detected (by performing diffs) in the outgoing PCAPs, further assisting in the identification of those differences in the outgoing PCAPs that are due to environmental noise (changes in the incoming PCAPs).

In some embodiments incoming data may be routed through a switch or other device in the test system that enables the test system to modify data returned by a server, e.g., substituting an advertisement saved in the test system for an advertisement provided by the server, so that the advertisement received by the application is known, predictable, and repeatable. Such a process may be referred to as "blacklisting". In this manner, some sources of environmental noise may be suppressed or eliminated.

Figure 4:
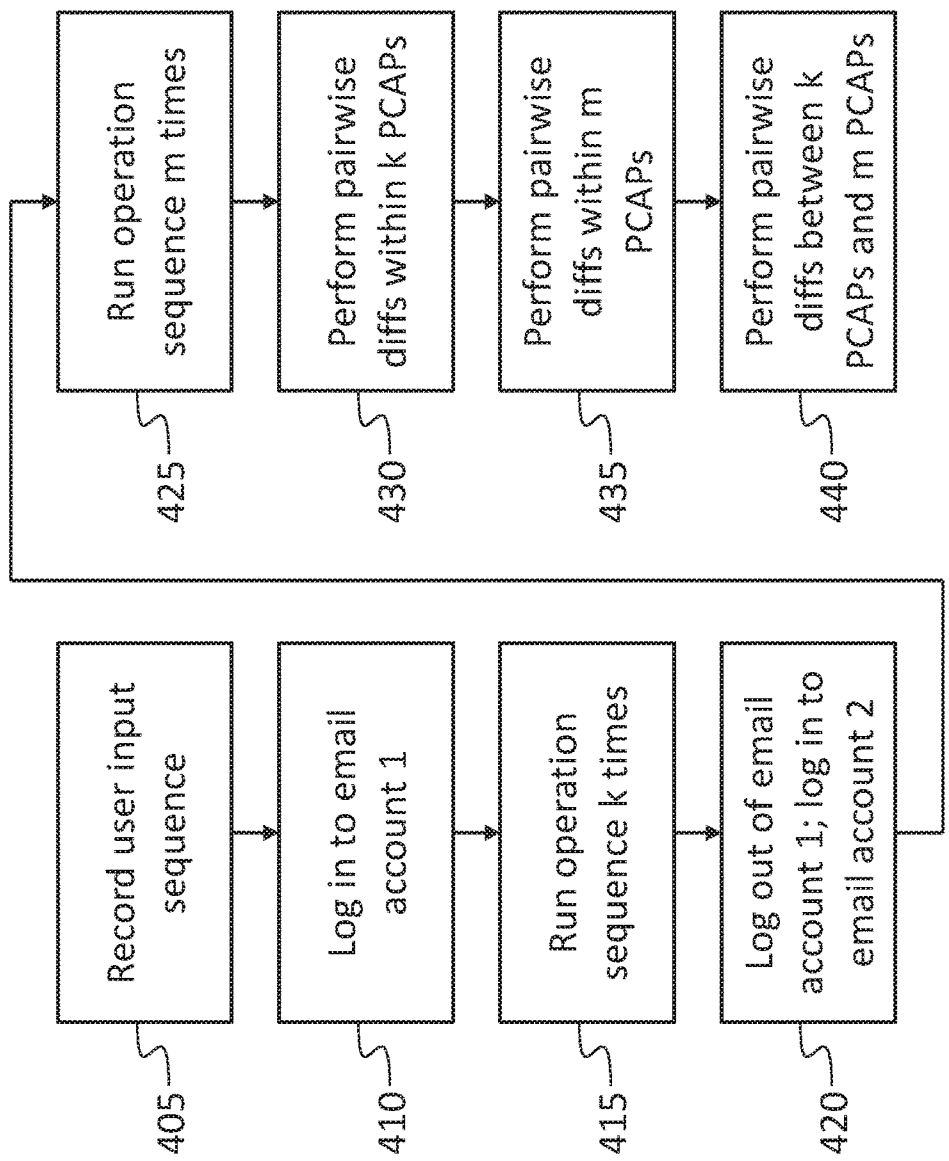
FIG. 4 is a flow chart of a method for characterizing an application, according to another embodiment of the present invention.

Referring to FIG. 4, in another embodiment, the exfiltration of personal information associated with a state of the computation device may be detected. For example, a user may be logged in to an email account, and the application being characterized may exfiltrate the email address to a server when it runs. To detect such exfiltration, an email client on the device may first, in an act 410, be logged in to a first email account. The application may, in an act 415, be run a number of times, e.g., k times, with an email client logged in to the first email account, and the set of outgoing PCAPs from these first k runs may be saved. The email client may then, in an act 420, be logged out of the first email account and logged in to a second email account. The application may, in an act 425, be run a number of times, e.g., m times, with an email client logged in to the second email account, and the set of outgoing PCAPs from this second set of m runs may be saved. In some embodiments m=k, i.e., the number of runs in the first set of k runs is the same as the number of runs in the second set of m runs.

In a manner analogous to that described above, differences identified either, in an act 430, within the set of outgoing PCAPs from the first set of k runs, or differences identified, in an act 435, within the set of outgoing PCAPs from the second set of m runs, may then be used to form a list of difference location identifiers for differences identified as being caused by environmental noise, and the exfiltration of personal information (e.g., of an email address) may then be detected by forming pairwise differences, in an act 440, between PCAPs from the first set of k runs and PCAPs from the second set of m runs, and eliminating any differences having locations that are on the list of difference location identifiers for differences identified as being caused by environmental noise. The remaining differences, after such an elimination, may then be inferred to indicate exfiltration of personal information associated with the state of the computation device.

The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over several interconnected PWBs. A processing unit may contain other processing units; for example a processing unit may include two processing units, an FPGA and a CPU, interconnected on a PWB.

Although limited embodiments of a method for automated application analysis for finding leaked personal information have been specifically described and illustrated herein, many modifications and variations will be apparent to those skilled in the art. Accordingly, it is to be understood that a method for automated application analysis for finding leaked personal information employed according to principles of this invention may be embodied other than as specifically described herein. The invention is also defined in the following claims, and equivalents thereof.

What is claimed is:

1. A method for detecting instances of exfiltration by an application, the method comprising:
   performing a first set of runs, the performing of the first set of runs including:
   running the application a plurality of times on a first computation device; and
   for each run, capturing packets transmitted by the first computation device to form a first plurality of captured packets;
   performing a second set of runs, the performing of the second set of runs including:
   running the application a plurality of times on a second computation device; and
   for each run, capturing packets transmitted by the second computation device to form a second plurality of captured packets;
   comparing packets from among the first plurality of captured packets pairwise to form a first list of packet location identifiers, each packet location identifier corresponding to a difference found between a packet from one run of the first set of runs and a corresponding packet from another run of the first set of runs;
   comparing packets from among the first plurality of captured packets pairwise with packets from among the second plurality of captured packets, to form a first set of inter-device differences; and
   eliminating from the first set of inter-device differences each difference corresponding to a packet location identifier in the first list of packet location identifiers.

2. The method of claim 1, further comprising:
   uninstalling the application from the first computation device when the first set of inter-device differences, after eliminating, from the first set of inter-device differences, each difference corresponding to a packet location identifier in the first list of packet location identifiers, is not empty.

3. The method of claim 1, further comprising comparing packets from among the second plurality of captured packets pairwise to form a second list of packet location identifiers, each packet location identifier corresponding to a difference found between a packet from one run of the second set of runs and a corresponding packet from another run of the second set of runs.

4. The method of claim 3, further comprising merging the second list of packet location identifiers into the first list of packet location identifiers.

5. The method of claim 1, wherein the second set of runs includes the same number of runs as the first set of runs.

6. The method of claim 1, further comprising:
   before performing the first set of runs, putting the first computation device into a first state; and
   after performing the first set of runs:
   putting the first computation device into a second state; and
   performing a third set of runs, the performing of the third set of runs including:
   running the application a plurality of times; and
   for each run, capturing packets transmitted by the first computation device to form a third plurality of captured packets;
   comparing packets from among the first plurality of captured packets pairwise with packets from among the third plurality of captured packets, to form a second set of inter-device differences; and
   eliminating, from the second the set of inter-device differences, each difference corresponding to a packet location identifier in the first list of packet location identifiers.

7. The method of claim 6, further comprising:
   uninstalling the application from the first computation device when the second set of inter-device differences, after eliminating, from the second set of inter-device differences, each difference corresponding to a packet location identifier in the first list of packet location identifiers, is not empty.

8. The method of claim 6, wherein in the first state, an email client running on the first computation device is logged in to a first email account and in the second state, the email client is logged in to a second email account, different from the first email account.

9. A method for detecting instances of exfiltration by an application, the method comprising:
putting a first computation device into a first state;
performing a first set of runs with the first computation device in the first state, the performing of the first set of runs including:
running the application a plurality of times on the first computation device; and
for each run, capturing packets transmitted by the first computation device to form a first plurality of captured packets;
putting the first computation device into a second state;
performing a second set of runs with the first computation device in the second state, the performing of the second set of runs including:
running the application a plurality of times on the first computation device; and
for each run, capturing packets transmitted by the first computation device to form a second plurality of captured packets;
comparing packets from among the first plurality of captured packets pairwise to form a first list of packet location identifiers, each packet location identifier corresponding to a difference found between a packet from one run of the first set of runs and a corresponding packet from another run of the first set of runs;
comparing packets from among the first plurality of captured packets pairwise with packets from among the second plurality of captured packets, to form a first set of inter-device differences; and
eliminating, from the first set of inter-device differences, each difference corresponding to a packet location identifier in the first list of packet location identifiers.

10. The method of claim 9, further comprising:
uninstalling the application from the first computation device when the first set of inter-device differences, after eliminating, from the first set of inter-device differences, each difference corresponding to a packet location identifier in the first list of packet location identifiers, is not empty.

11. The method of claim 9, further comprising comparing packets from among the second plurality of captured packets pairwise to form a second list of packet location identifiers, each packet location identifier corresponding to a difference found between a packet from one run of the second set of runs and a corresponding packet from another run of the second set of runs.

12. The method of claim 11, further comprising merging the second list of packet location identifiers into the first list of packet location identifiers.

13. The method of claim 12, wherein the second set of runs includes the same number of runs as the first set of runs.

* * * * *